(12) United States Patent
Toba (10) Patent No.: US 8,755,843 B2
(45) Date of Patent: Jun. 17, 2014

(54) PORTABLE TELEPHONE EQUIPPED WITH KEY BACKLIGHTS AND INFORMATION NOTIFICATION METHOD USING KEY BACKLIGHTS

(75) Inventor: Hiroyuki Toba, Saitama (JP)

(73) Assignee: NEC Corporation, Tokyo (JP)

( * ) Notice: Subject to any disclaimer, the term of this patent is extended or adjusted under 35 U.S.C. 154(b) by 301 days.

(21) Appl. No.: 13/000,863

(22) PCT Filed: Aug. 4, 2009

(86) PCT No.: PCT/JP2009/063805
§ 371 (c)(1),
(2), (4) Date: Dec. 22, 2010

(87) PCT Pub. No.: WO2010/016489
PCT Pub. Date: Feb. 11, 2010

(65) Prior Publication Data
US 2011/0111797 A1    May 12, 2011

(30) Foreign Application Priority Data

Aug. 6, 2008   (JP) .................................. 2008-203538

(51) Int. Cl.
*H04M 1/00* (2006.01)
*H04B 1/38* (2006.01)

(52) U.S. Cl.
USPC .......... 455/566; 340/7.51; 345/170; 345/589; 345/593; 379/162; 455/412.1

(58) Field of Classification Search
USPC .......... 340/7.51; 345/170, 589, 593; 379/162; 455/412.1, 566
See application file for complete search history.

(56) References Cited

U.S. PATENT DOCUMENTS 7,388,590 B2 *  6/2008  O'Neil et al. .................. 345/589
7,684,829 B2 *  3/2010  Jeong ............................ 455/566
(Continued)

FOREIGN PATENT DOCUMENTS

CN    2468238 Y    12/2001
CN    1852341 A    10/2006
(Continued)

OTHER PUBLICATIONS

International Search Report for PCT/JP20091063805 mailed Sep. 15, 2009.
(Continued)

*Primary Examiner* — Charles Appiah
*Assistant Examiner* — Jaime Holliday
(74) *Attorney, Agent, or Firm* — Sughrue Mion, PLLC (57) ABSTRACT

A portable telephone includes key backlight light-emitting units 41, 42 that are provided corresponding to a plurality of operation keys 31, 32 and control unit 5 that instructs key backlight light-emitting units 41, 42 about the colors of the light that is to be emitted. Key backlight light-emitting units 41, 42 respectively include a plurality of light-emitting devices 411, 421 that produce different colors and lighting control units 412, 422 that control the plurality of light-emitting devices 411, 421 in accordance with instructions from control unit 5. Control unit 5 instructs to cause light to be emitted in a specified color to key backlight light-emitting units that correspond to one or a plurality of operation keys and instructs to cause light to be emitted in colors other than the specified color to key backlight light-emitting units other than the key backlight light-emitting units that are lighted in the specified color.

4 Claims, 10 Drawing Sheets

(56) References Cited

U.S. PATENT DOCUMENTS

| | | | |
|---|---|---|---|
| 2004/0171410 A1* | 9/2004 | Deeds | 455/575.1 |
| 2004/0224670 A1* | 11/2004 | Hull et al. | 455/412.1 |
| 2008/0182626 A1* | 7/2008 | Watanabe | 455/564 |

FOREIGN PATENT DOCUMENTS

| | | |
|---|---|---|
| JP | 217904 A | 8/2001 |
| JP | 2001285173 A | 10/2001 |
| JP | 2002077333 A | 3/2002 |
| JP | 2002101195 A | 4/2002 |
| JP | 200 5134998 A | 5/2005 |
| JP | 2005267629 A | 9/2005 |
| JP | 2006101313 A | 4/2006 |
| JP | 2006520125 A | 8/2006 |
| JP | 2006261944 A | 9/2006 |

OTHER PUBLICATIONS

Office action in counterpart CN patent application 200980130977.2, dated Apr. 3, 2013.

* cited by examiner

PORTABLE TELEPHONE EQUIPPED WITH KEY BACKLIGHTS AND INFORMATION NOTIFICATION METHOD USING KEY BACKLIGHTS

This application is the National Phase of PCT/JP2009/063805, filed Aug. 4, 2009, which claims the benefits of priority based on Japanese Patent Application No. 2008-203538 for which application was submitted on Aug. 6, 2008 and incorporates all of the disclosures of that application.

TECHNICAL FIELD

The present invention relates to portable telephone equipped with key backlights that illuminate keys and to a notification method that uses the key backlights.

BACKGROUND ART

While the increased functionality of portable telephones has been accompanied by the incorporation of various functions, recent years have also witnessed the necessity for designs and functions that match the user's preferences regarding, for example, case designs, images, and melodies. The method of communicating information from a portable telephone to a user is implemented by way of indicators such as liquid crystal screens, but schemes other than communicating by way of a liquid crystal screen are necessary for the display and presentation of various types of information. However, light-emitting elements that can be used apart from communicating by of a liquid crystal screen in a portable telephone are limited to incoming message LEDs and LEDs arranged on the exterior side of the case. In addition, key backlights that are incorporated for illuminating keys merely light all or a portion of the keys in a single color.

Prior art exists as a lighting method for communicating information to a user in a portable terminal apparatus in which a color produced on the liquid crystal screen is matched to a color produced in the key backlights to guide the user to a target function (for example, see Patent Document 1). In the method described in Patent Document 1, color values relating to an event are determined, display is implemented on a liquid crystal screen with the determined color values while simultaneously lighting the key backlights with the same color to alert the user to an event from the color and to guide the user to the event displayed on the liquid crystal screen.

PRIOR-ART DOCUMENTS

Patent Documents

Patent Document 1: Japanese Patent Application No. 2005-267629 (paragraphs 0004-0006)

DISCLOSURE OF THE INVENTION

Problem to be Solved by the Invention

In the method disclosed in Patent Document 1, however, guidance to an event displayed on the liquid crystal screen is realized by means of the color produced in the key backlights, and the user ultimately must check the liquid crystal screen display. In other words, it is difficult for the user to obtain detailed information relating to an event based only on the state of the key backlight illumination.

It is therefore an object of the present invention to provide a portable telephone equipped with key backlights that are capable of communicating information to the user by only the emitted light of the key backlights that illuminate keys and an information notification method that uses key backlights.

Means for Solving the Problem

The portable telephone that is equipped with key backlights according to the present invention is provided with: key backlight light-emitting units that are provided corresponding to each of a plurality of operation keys and that illuminate each of the operation keys; and a control unit that supplies control signals that provide instructions to the key backlight light-emitting units about the colors of the light that is to be emitted; the key backlight light-emitting units each including a plurality of light-emitting devices that produce different colors and a light control unit that realizes lighting control of the plurality of light-emitting devices in accordance with control signals from the control unit; and the control unit supplying control signals for causing light to be emitted in a specified color in key backlight light-emitting units that correspond to one or a plurality of operation keys and supplying control signals for causing light to be emitted in colors other than the specified color in the key backlight light-emitting units other than the key backlight light-emitting units that are lighted in the specified color.

The information notification method that uses key backlights according to the present invention is an information notification method that uses key backlights and is executed in a portable telephone that is equipped with key backlight light-emitting units that are provided corresponding to a plurality of operation keys and that illuminate each of the operation keys, the key backlight light-emitting units each including a plurality of light-emitting devices that produce different colors and a lighting control unit that controls lighting of the plurality of light-emitting devices; the information notification method being characterized by causing light to be emitted in a specified color by the key backlight light-emitting units that correspond to one or a plurality of operation keys and causing light to be emitted in colors other than the specified color by the key backlight light-emitting units other than the key backlight light-emitting unit that is lighted in the specified color.

Effect of the Invention

The present invention is able to provide a portable telephone equipped with key backlights that can communicate information to a user by only the colors produced by the key backlights that illuminate keys and an information notification method that uses key backlights.

DESCRIPTION OF EMBODIMENTS OF THE INVENTIONS

Figure 1:
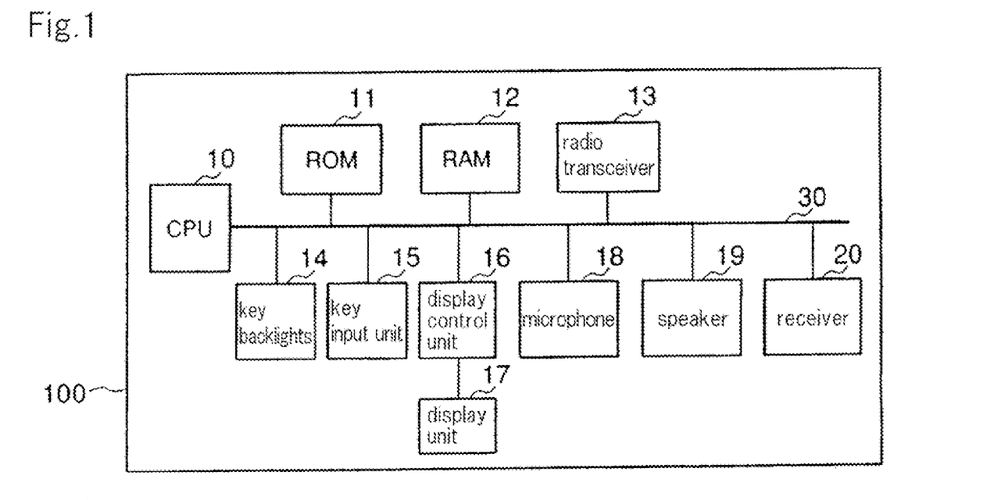
FIG. 1 is a block diagram showing the principal parts of the circuit configuration in an exemplary embodiment of the portable telephone according to the present invention.

FIG. 1 is a block diagram showing the principal parts of the circuit configuration in an exemplary embodiment of a portable telephone according to the present invention.

Portable telephone 100 is provided with CPU 10, ROM 11, RAM 12, radio transceiver 13, key backlights 14, key input unit 15, display control unit 16, display unit 17, microphone 18, speaker 19, and receiver 20. Each element other than display unit 17 is connected to CPU 10 by way of bus 30. Display unit 17 that uses liquid crystal display elements is connected to display control unit 16 by way of bus 30.

CPU 10 implements control relating to telephone conversation and data transmission and reception that uses portable telephone 100, and further implements various controls such as key backlight control, power-saving control, and melodic ringtone control. ROM 11 stores a control program used for executing various controls by CPU 10 and fixed melody data.

RAM 12 is memory used for saving data applied as input by a user and saving data that have been downloaded. RAM 12 is further used as memory for temporarily saving data when accessing the Internet or as memory for work.

Radio transceiver 13 is a circuit for carrying out the transmission and reception of data by radio transmission.

Key backlights 14 illuminate various keys such as numeric keys that accept the input by key input unit 15, function keys, and keys arranged on the exterior of portable telephone 100 when portable telephone 100 is folded. Essentially, key backlights 14 are established, for example, behind, directly below, or in the vicinity of various keys, all or a portion of the key backlights 14 using a transparent material and illuminating various keys to highlight the keys. Key backlights 14 further include key backlight LEDs and RGB control units.

Key input unit 15 is an input circuit that accepts input signals when input operations are performed from the user on various keys such as numeric keys, function keys, and keys arranged on the outer side of the case of portable telephone 100.

Display control unit 16 is a control circuit that controls the display in display unit 17 that is chiefly a liquid crystal screen.

Microphone 18, speaker 19, and receiver 20 are acoustic components used when implementing telephone conversation. The user applies voice as input by means of microphone 18, and speaker 19 or receiver 20 supplies the voice of the conversation partner or a ringtone.

Key backlights 14, which are the principal elements of the present invention, are next described in detail.

Figure 2:
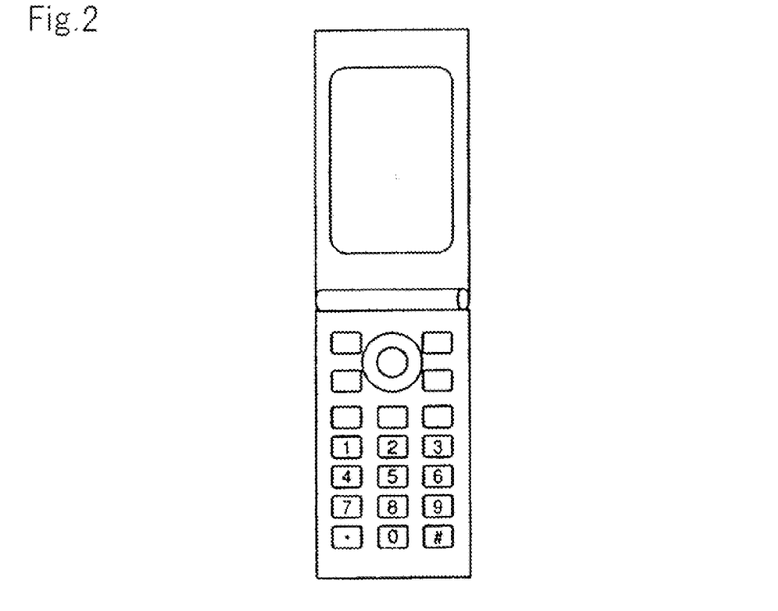
FIG. 2 is an explanatory view showing the outer appearance of a folding portable telephone in an open state.

FIG. 2 is an explanatory view showing the outer appearance of a folding portable telephone in the open state. The positions of numeric keys and function keys are shown.

Figure 3:
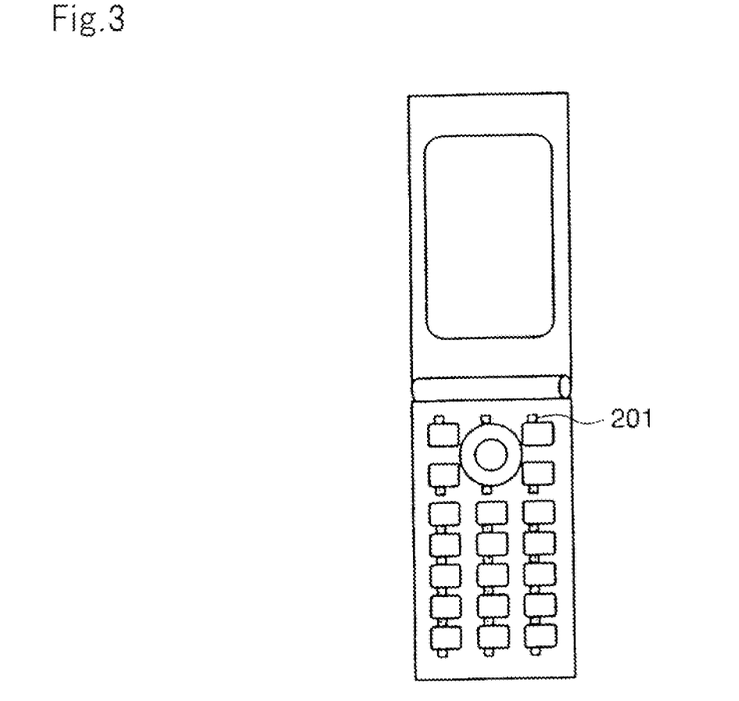
FIG. 3 is an explanatory view showing the external appearance of a portable telephone that clearly shows an example of the positions where key backlight LEDs have been installed.

FIG. 3 is an explanatory view showing the outer appearance of the portable telephone that clearly shows an example of the positions where key backlight LEDs have been installed. Key backlight LEDs 201 are LED chips arranged at locations directly beneath or close to all or any buttons (keys) of portable telephone 100. In the present exemplary embodiment, 21 key backlight LEDs 201 are installed at the 21 positions of three horizontal rows and seven vertical rows as shown in FIG. 3. In the present specification, when key backlight LEDs 201 that illuminate specific keys are caused to emit light, this is expressed as, for example, "key backlight LED 201 of numeric key "1" is lighted." In this case, numeric key "1" corresponds to the specific key. In addition, when all 21 key backlight LEDs 201 are caused to emit light together, this is expressed as "key backlights 14 are lighted."

Key backlight LEDs 201 are converted to RGB by the three types of light-emitting devices R, G, and B. In addition, key backlight LEDs 201 and RGB control units exist in one-to-one sets. Key backlights 14 include 21 sets of key backlight LEDs 201 that have been converted to RGB and RGB control units (RGB sets) in portable telephone 100 shown in FIG. 3. Each of the RGB sets can then be turned on in separately controlled colors. In other words, key backlights 14 can not only light all 21 RGB sets in the same color, but can also light up 21 colors that differ for each RGB set.

Figure 4:
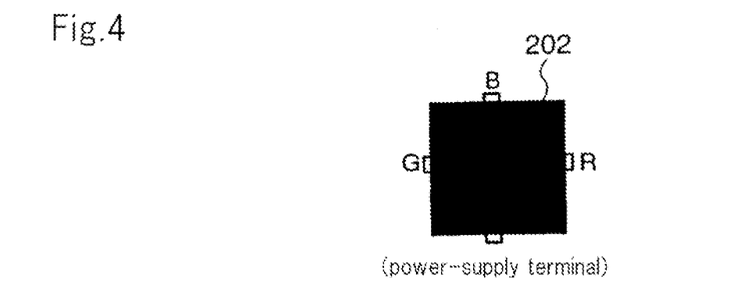
FIG. 4 is an explanatory view showing an example of the construction of lights in the exemplary embodiment.

FIG. 4 is an explanatory view showing an example of the configuration of light 202 in the present exemplary embodiment. Light 202 is the principal part of key backlight LED 201 that has been converted to RGB. Light 202 is equipped with light-emitting devices of each of R, G, and B, and each light-emitting device is connected to an RGB control unit (not shown). The RGB control unit is incorporated inside light 202 and controls the lighting or extinguishing of each light-emitting device.

Figure 5:
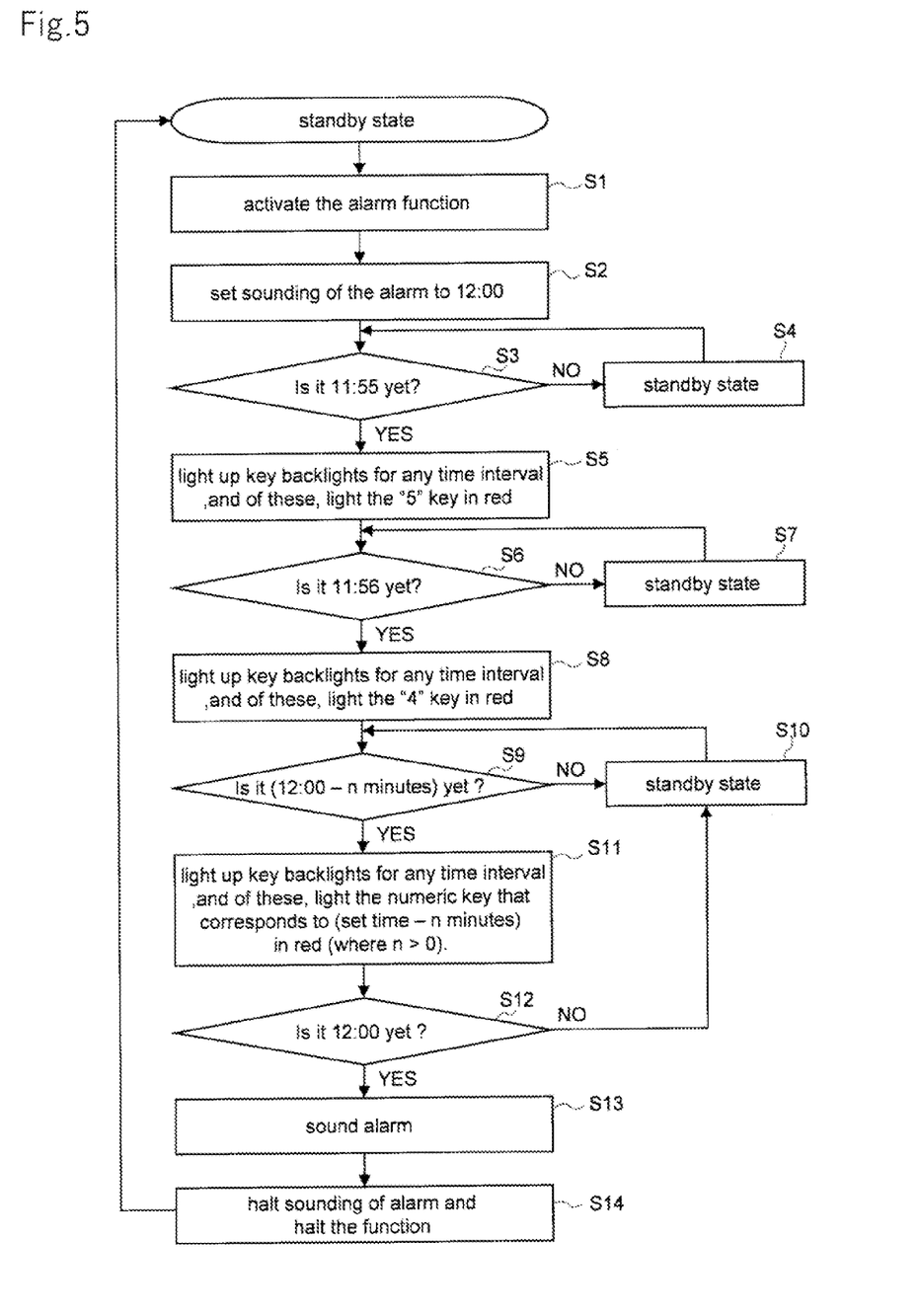
FIG. 5 is a flow chart showing processing in the alarm operation.

The information notification method that uses key backlight LEDs 201 is next described. FIG. 5 is a flow chart showing the processing in the alarm operation that is an example of implementation in the exemplary embodiment of the present invention. The processing in the alarm operation is next described with reference to the flow chart of FIG. 5.

Key backlight LEDs 201 other than a specified key backlight LED 201 in key backlights 14 are set to light up in white. Further, in key backlights 14, only key backlight LED 201 of a specified numeric key is assumed to be set to light up at five minutes before a time for which an alarm sound is set in a color that differs from white, for example, red.

A clock that indicates the time and an image set to the preference of the user are displayed on liquid crystal screen in display unit 17 of portable telephone 100 in the standby state. When the user carries out a predetermined key operation for activating the alarm function in the standby state, CPU 10 receives the content of the key operation from key input unit 15 and activates the alarm function (Step S1). The time at which the alarm function was activated is assumed to be earlier than 11:54.

When the user carries out predetermined key operation to apply input such that the alarm will sound at 12:00, CPU 10 receives the content of the key operation from key input unit 15 and sets the sounding of the alarm (Step S2).

CPU 10 judges whether 11:55 has arrived (Step S3). Until the time reaches 11:55, the standby state continues without change (more specifically, a state in which the alarm does not operate in the standby state, and moreover, a state in which the lighted state of key backlights 14 remains unchanged) (Step S4), and the processing of Step S3 continues.

When CPU 10 determines that 11:55 has been reached in Step S3, CPU 10 sends a control signal to key backlights 14 (Step S5). The content of the control signal is to light key backlight LEDs 201 in white other than key backlight LED 201 of numeric key "5" and to light key backlight LED 201 of numeric key "5" in red. CPU 10 further turns on key backlight 14 for any set time interval no greater than 60 seconds in duration. In each of key backlight LEDs 201 (more specifically, lights 202) in key backlights 14, the RGB control units control the R, G, and B light-emitting devices in accordance with the control signals.

CPU 10 next determines whether 11:56 has been reached or not (Step S6). Until 11:56 has been reached, the standby state continues without change (Step S7) and the process of Step S6 is continued.

When CPU 10 determines that 11:56 has been reached in Step S6, CPU 10 sends a control signal to key backlights 14 (Step S8). The content of the control signal is to light key backlight LEDs 201 other than key backlight LED 201 of numeric key "4" in white and to light only key backlight LED 201 of numeric key "4" in red. CPU 10 further lights up key backlight 14 for any set time interval that does not exceed 60 second in duration (for example, 30 seconds). In each of key backlight LEDs 201 (more specifically, lights 202) in key backlights 14, the RGB control units control the R, G, and B light-emitting devices in accordance with the control signals.

CPU 10 judges whether the time has reached a time found according to the formula "(12:00−n minutes)" in processing similar to the processing of Steps S3-S5 and the processing of Steps S6-S8 (Step S9). It is assumed that "n" is a positive integer. The standby state continues unchanged (Step S10) and the process of Step S9 is continued until the time reaches the time found according to the formula "(12:00−n minutes)."

When CPU 10 has determined that the time has reached a time found according to the formula "(12:00−n minutes)" in Step S9, CPU 10 sends a control signal to key backlights 14 (Step S11). The content of the control signal is to light up in white key backlight LEDs 201 other than key backlight LED 201 of the numeric key that corresponds to the value found according to the formula "(set time−n minutes)" and to light up in red only key backlight LED 201 of the numeric keys that corresponds to the value found according to the formula "(set time−n minutes)." CPU 10 further lights up key backlights 14 for any set time interval that does not exceed 60 seconds in duration (for example, 30 seconds). RGB control units in each of key backlight LEDs 201 (more specifically, lights 202) in key backlights 14 control the R, G, and B light-emitting devices in accordance with the control signals.

CPU 10 next judges whether the time is 12:00 (Step S12). The process transitions to Step S10 when the time is not yet 12:00. When CPU 10 determines that the time is 12:00 in Step S12, CPU 10 sends a control signal to display control unit 16 and speaker 19 in order to cause sounding of the alarm (Step S13).

When an operation for stopping the sounding of the alarm and an operation for halting the function are carried out by the user, or when the alarm function is halted in accordance with settings that have been set in advance in portable telephone 100, the process returns to the standby state (Step S14).

Although an example has been described in which key backlight LED 201 of a specified numeric key is lighted in red and other key backlight LEDs 201 are lighted in white, this case is only an example, and other varieties of produced colors and lighting patterns (lighting/flashing) may be selected. These schemes can be selected by the user.

Figure 6:
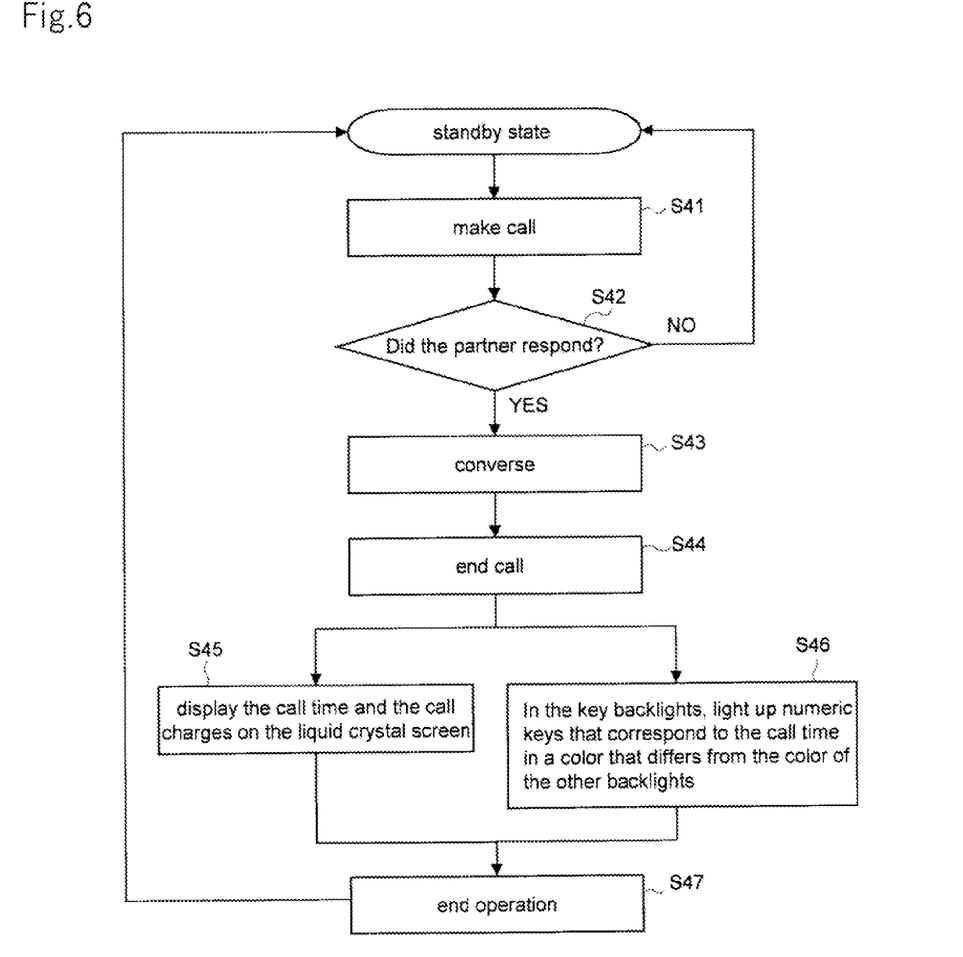
FIG. 6 is a flow chart showing the method of communicating call time information after the completion of a call.

FIG. 6 is a flow chart showing the method of notifying call time information after the end of a call, this being another example of the information notification method. The processing of reporting call time information is described with reference to the flow chart of FIG. 6. Key backlights 14 are assumed to be set such that key backlight LEDs 201 other than a specified key backlight LED 201 light up in white. Alternatively, key backlight LED 201 for information notification (specified key backlight LED 201) is set to light tip in green.

A clock that indicates the time and images that are set by the preferences of the user, are displayed in the liquid crystal screen in display unit 17 of portable telephone 100. In the standby state, when a user carries out predetermined key operation to make a telephone call, CPU 10 receives the content of the key operation from key input unit 15, sends a signal to radio transceiver 13, and initiates the telephone call to a predetermined call destination (Step S41).

CPU 10 checks whether there is a response from the telephone call destination (receiving side) (Step S42) and when the receiving side does not respond, returns to the standby state without beginning the call. Where the receiving side responds, the process transitions to the call state (Step S43). The call state continues until the call ends.

When the call ends, i.e., upon entering a call end state (Step S44), a call control process that accompanies the end of telephone communication is carried out. CPU 10 then both displays information such as the call time and the call charges on the liquid crystal screen of portable telephone 100 (Step S45) and reports the call time to key backlights 14 (Step S46).

In Step S46, CPU 10 sends a control signal to key backlights 14. The content of the control signal causes key backlight LEDs 201 other than key backlight LED 201 of the numeric key that indicates the call time (assumed here to be, for example, 10 minutes) to light up in white and causes only key backlight LED 201 of the numeric key that indicates the call time to light up in green. In addition, CPU 10 causes key backlights 14 to light up for any set time period (for example, one second). RGB control units in each of key backlight LEDs 201 in key backlights 14 (more specifically, lights 202) control the R, G, and B light-emitting devices in accordance with control signals.

Figure 7:
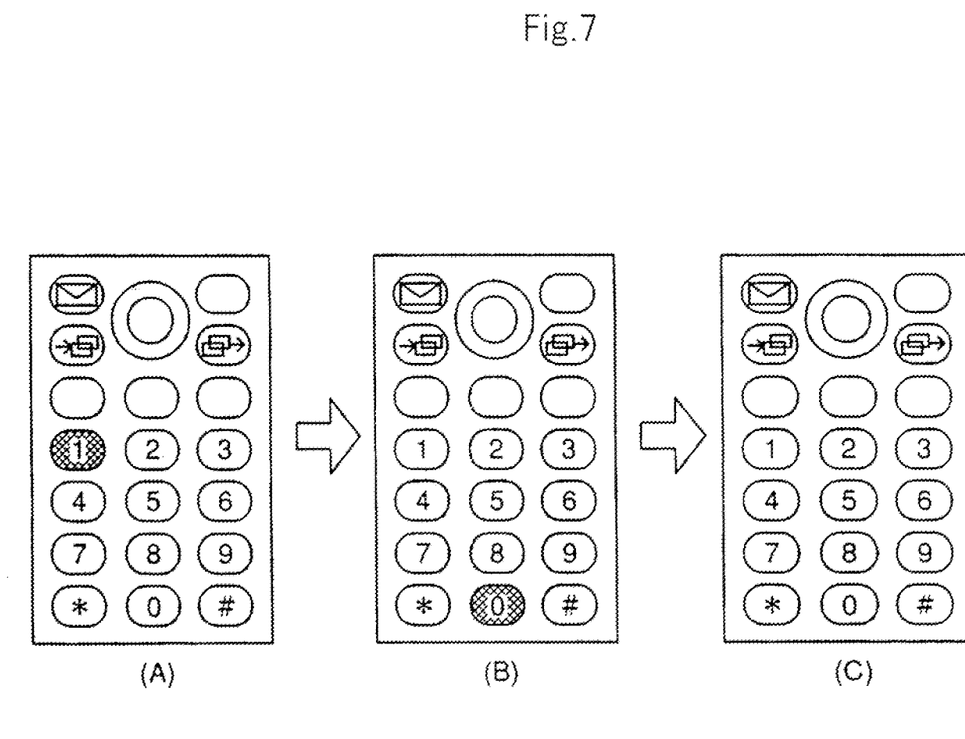
FIG. 7 is an explanatory view showing an example of the processing of Step S46 in FIG. 6.

FIG. 7 is an explanatory view showing an example of the processing of Step S46 shown in FIG. 6. In FIG. 7, keys indicated by white indicate keys corresponding to key backlight LEDs 201 that are lighted in white and keys indicated by cross-hatching with diagonal lines (the "1" key in FIG. 7(A) and the "0" key in FIG. 7(B)) indicate keys corresponding to key backlight LEDs 201 that are lighted in a color other than white. In addition, FIGS. 7(A)-(C) show changes in the lighted state that accompany the passage of time. The processing of Step S46 is next described using the explanatory views show in FIGS. 7(A)-(C).

When the call time is ten minutes, CPU 10 sends a control signal to key backlight 14. In accordance with the control signal, key backlight LED 201 that illuminates the "1" key of numeric keys first lights up in key backlights 14 (FIG. 7(A)). Next, key backlight LED 201 that illuminates the "0" key of the numeric keys lights up in green for one second (FIG. 7(B)). All key backlight LEDs 201 then light up in white for one second (FIG. 7(C)). When the series of three lighting patterns shown in FIGS. 7(A)-(C) is lighted, the numeric information "10" that indicates the call time is reported to the user. The series of lighting is repeated during the interval in which the liquid crystal display is carried out.

The information display on the liquid crystal screen realized by the process of Step S45 and the series of lighting realized by the processing of Step S46 stop operating after the passage of a fixed time (for example, 10 seconds) and portable telephone 100 returns to the standby state (Step S47).

In the present exemplary embodiment, the lighting time in each lighting pattern is one second, but the lighting time may be other time intervals, and the colors that are lighted may be selected by the user. Further, key backlight LEDs 201 may be caused to flash instead of being lighted up. Although the call time was reported by lighting up key backlight LEDs 201, the call charges may also be reported.

Although an example was presented for a case in which the call time is reported as an example of visually communicating numerical information to the user in the flow chart of FIG. 6, the clock display may also be carried out.

When the call time is reported, the number "10" was visually communicated to the user, but when clock display is carried out, a time such as "12:15" is communicated to the user.

When the time "12:15" is to be reported to the user, CPU 10 sends a control signal to key backlights 14. The content of the control signal is to cause key backlight LEDs 201 of all keys to light up in white for one second and then to cause numeric keys "1," "2," "1," and "5" to successively light up in green for one second each, and moreover, to light up in white key backlight LEDs 201 other than numeric keys that are lighted up in green. In addition, CPU 10 causes key backlight 14 to light up for any set time interval (for example, 5 seconds). In each of key backlight LEDs 201 (more specifically, lights 202) in key backlights 14, RGB control units control the R, G, and B light-emitting devices in accordance with the control signals.

The operation from lighting up in white all key backlight LEDs 201 until successively lighting up backlight LEDs 201 of numeric keys "1," "2," "1," and "5" is completed is assumed to be one cycle but may be operated for a plurality of cycles. In addition, colors different from the white color that is used when lighting up all key backlight LEDs 201 may also be used to distinguish the colors lighted for hours and minutes. Still further, information relating to seconds may also be reported to the user by lighting up key backlight LEDs 201.

Another example of the process of reporting information to the user is next described.

When the liquid crystal screen portable telephone 100 stops display to save power, the clock display may be performed by the above-described lighting key backlight LEDs 201 instead of the flashing operation of key backlight 14 that is typically used to indicate that the power-saving operation is continuing.

In addition, when using the image-recording/sound-recording functions realized by a camera and microphone 18 that are provided in portable telephone 100, the notification to the user by means of lighting or flashing of key backlights 14 may also be used to indicate the remaining recording time to a recording medium that is incorporated in portable telephone 100 or an externally connected recording medium. Further, during charging of a rechargeable battery of portable telephone 100, the lighting or flashing of key backlights 14 may be used to display an estimate of the time remaining until completion of charging. Still further, the lighting or flashing of key backlights 14 may be used to display an estimate of the time until the power-saving operation begins.

The notification to the user by the lighting or flashing of key backlights 14 may be used to report the number of unread email messages when the user is performing electronic mail (hereinbelow referred to as email) operations, may be used when completion of email reception is displayed on display unit 17, or may be used to report the number of newly arrived email messages when the user has performed an opening operation or sliding operation on a portable telephone having a folding structure of slide structure.

Alternatively, the lighting or flashing of key backlights 14 may be used to report the number of missed call records when the user is operating a call history or has performed an opening operation or slide operation.

In addition, not only may key backlight LEDs 201 of numeric keys be used to report information to the user, but key backlights 201 of symbol keys such as an email creation key or a received-call history key may also be used to report information to the user. A case in which key backlight LEDs 201 of symbol keys are used to report information to the user is next described.

Figure 8:
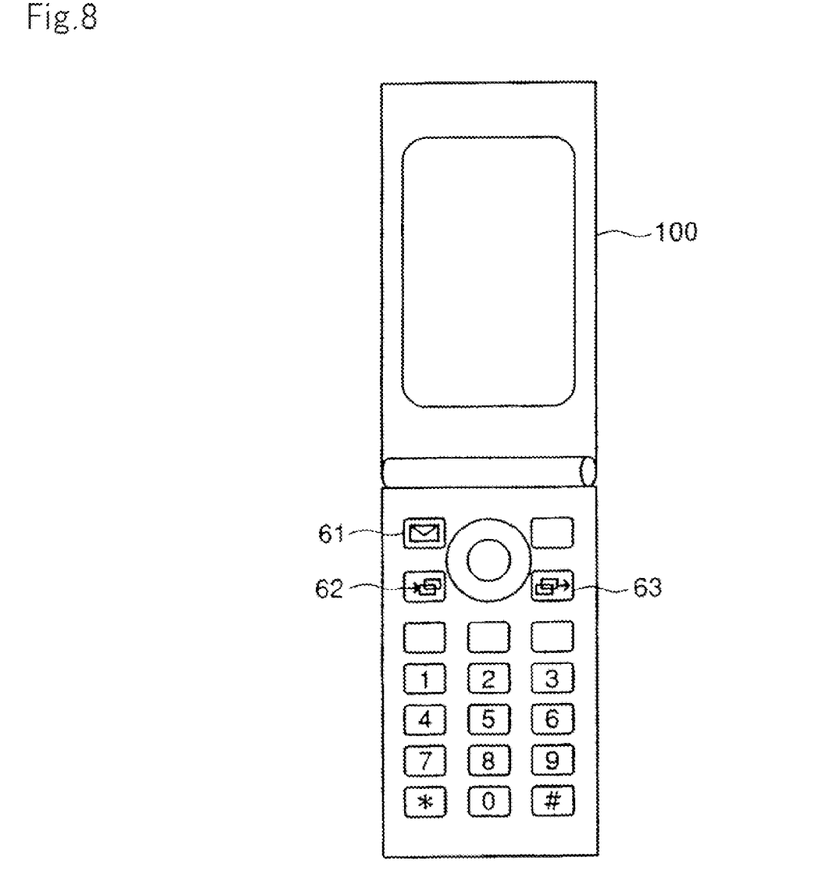
FIG. 8 is an explanatory view showing the external appearance of a portable telephone that clearly shows the positions of symbol keys.

FIG. 8 is an explanatory view showing the outer appearance of the portable telephone showing the positions of symbol keys. Email key 61 is a key assigned to activation of email functions such as transmitting and receiving email and creating new email. Received-call history key 62 is a key assigned to displaying the telephone received-call history. Call history call key 63 is a key assigned to the display of telephone call history.

Figure 9:
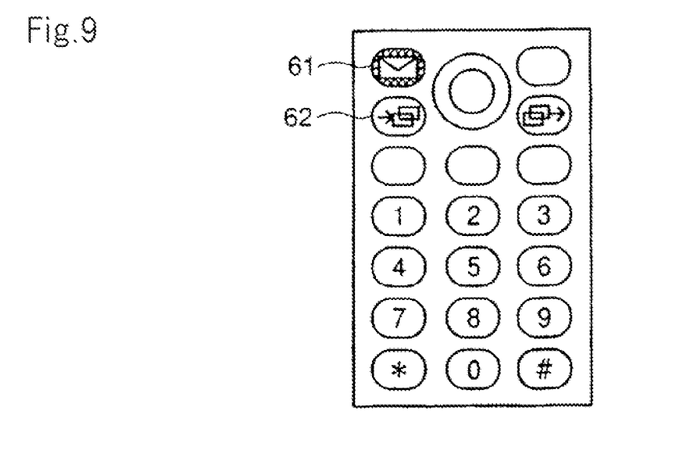
FIG. 9 is an explanatory view showing an example of the lighting pattern at the time of receiving email.

FIG. 9 is an explanatory view showing an example of the lighting pattern when email is received. FIG. 9 shows that key backlight LEDs 201 of keys indicated in white are lighted in white, and key backlight LEDs 201 of keys cross-hatched by diagonal lines (only email key 61 in FIG. 9) are lighted in a color other than white.

When radio transceiver 13 receives email in portable telephone 100, CPU 10 both activates an incoming sound indicating the arrival of email and carries out screen display indicating the arrival of email on display unit 17. At this time, CPU 10 sends a control signal to key backlights 14. The content of the control signal is to light up in white key backlight LEDs 201 other than key backlight LED 201 of email key 61 and to light up in blue only key backlight LED 201 of email key 61. CPU 10 further causes key backlights 14 to light up for any set time interval (for example, 30 seconds). In each of key backlight LEDs 201 (more specifically, lights 202) in key backlights 14, RGB control units control the R, G, and B light-emitting devices in accordance with control signals.

In this example, differences of lighted colors can communicate to the user the operation of functions relating to email (in this case, the arrival of email). Key backlight LED 201 of email key 61 may be caused to flash instead of being lighted in blue.

When a telephone call or video telephone call arrives, key backlight LED 201 of received-call history key 62 instead of email key 61 may be caused to light or flash in a color different from the color of other key backlights.

Although an information notification method at the time of the arrival of email, at the time of arrival of a telephone call or at the time of arrival of a video telephone call has been described, the present information notification method may be executable only when set to a silent mode, which is an operation mode in which sound is not produced. In a typical portable telephone, when a call is received when the silent mode setting has been forgotten, reporting of the incoming call is realized by display on display unit 17 or by the vibration of a vibrator, but when the information notification method according to the present invention is used, the report of an incoming call to a user can be realized by further using characters printed at keys and the color produced by key backlights 14.

In addition, not only may key backlights 14 be used to report information at the time of arrival of email or a telephone call, the arrival of email may also be reported when portable telephone 100 is in the standby state. Implementing notification by means of a lighted display when in the standby state enables communication of newly arrived email or missed incoming calls to the user.

Figure 10:
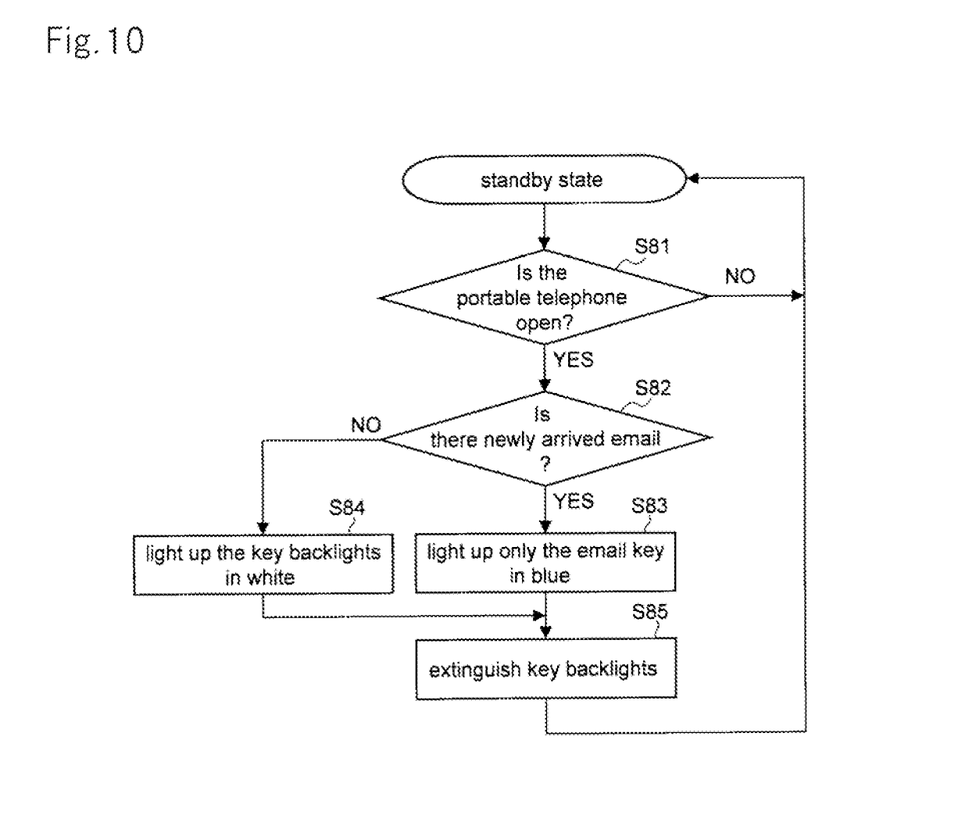
FIG. 10 is a flow chart showing the notification method of newly arrived email when email has newly arrived in a portable telephone that is in the standby state.

FIG. 10 is a flow chart showing a method of reporting newly arrived email when email newly arrives at portable telephone 100 that is in the standby state.

When the user opens portable telephone 100 that is in the standby state (Step S81), CPU 10 checks whether there is newly arrived email (Step S82).

If there is newly arrived email in Step S82, CPU 10 sends a control signal to key backlights 14 (Step S83). The content of the control signal is to cause key backlight LEDs 201 other than key backlight LED 201 of email key 61 to light up in a key backlight color that is set (for example, white) and to cause only key backlight LED 201 of email key 61 to light up in blue. CPU 10 further causes key backlights 14 to light up for any set time interval (for example, 15 seconds). In each of key backlight LEDs 201 (more specifically, lights 202) of key backlights 14, RGB control units control the R, G, and B light-emitting devices in accordance with control signals. Then, after the passage of a fixed time interval (for example, 15 seconds), key backlight LEDs 201 all turn off (Step S85) and the state returns to the standby state.

When it is verified in Step S82 that there is no newly arrived email, CPU 10 sends a control signal to key backlights 14 (Step S84). The content of the control signal is to cause all key backlight LEDs 201 to light up in a set key backlight color (for example, white). CPU 10 further causes key backlights 14 to light up for any set time interval (for example 15 seconds). In each of key backlight LEDs 201 (more specifically, lights 202) in key backlights 14, RGB control units control the R, G, and B light-emitting devices in accordance with control signals. Then, after the passage of a fixed time interval (for example, 15 seconds) key backlight LEDs 201 all turn off (Step S85) and the state returns to the standby state.

Figure 11:
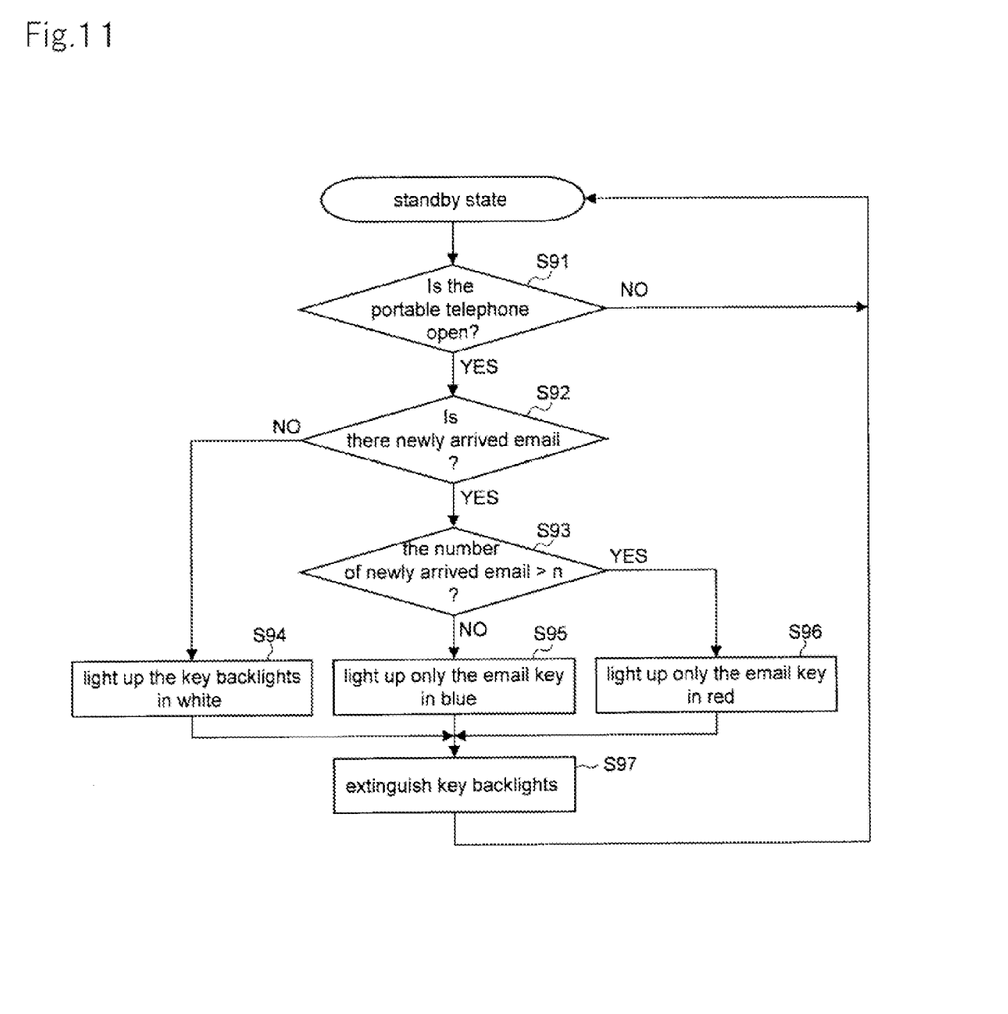
FIG. 11 is a flow chart showing the method of reporting the existence of newly arrived email and the number of newly arrived email messages when email has newly arrived in a portable telephone that is in the standby state.

Alternatively, key backlights 14 may be used to report the number of newly arrived email messages. FIG. 11 is a flow chart showing the method of reporting the existence of newly arrived email and the number of newly arrived email messages when there is newly arrived email in portable telephone 100 that is in the standby state.

When the user opens portable telephone 100 that is in the standby state (Step S91), CPU 10 checks whether there is newly arrived email or not (Step S92).

When it is verified that there is no newly arrived email in Step S92, CPU 10 sends a control signal to key backlights 14 (Step S94). The content of the control signal is to cause all key backlight LEDs 201 to light up in the set key backlight color (for example, white). In addition, CPU 10 causes key backlights 14 to light up for any set time interval (for example, 15 seconds). In each of key backlight LEDs 201 (more specifically, lights 202) in key backlights 14, RGB control units control the R, G, and B light-emitting devices in accordance with control signals. Then, after the passage of a fixed time interval (for example, 15 seconds), key backlight LEDs 201 all turn off (Step S97) and the state returns to the standby state.

When it is verified that there is newly arrived email in Step S92, CPU 10 checks the number of newly arrived email messages and judges whether the number of newly arrived email messages is greater than N (where N is a positive integer, here assumed to be "10") that has been set in advance as a threshold value (Step S93).

When it is determined in Step S93 that the number of newly arrived email messages is less than, for example, 10, CPU 10 sends a control signal to key backlights 14 (Step S95). The content of the control signal is to cause key backlight LEDs 201 other than key backlight LED 201 of email key 61 to light up in a set key backlight color (for example, white) and to cause only key backlight LED 201 of email key 61 to light up in blue. In addition, CPU 10 causes key backlights 14 to light up for any set time interval (for example, 15 seconds). In each of key backlight LEDs 201 (more specifically, lights 202) in key backlights 14, RGB control units control the R, G, and B light-emitting devices in accordance with control signals. Then, after the passage of a fixed time interval (for example, 15 seconds), all key backlight LEDs 201 turn off (Step S97) and the state returns to the standby state.

When it is determined in Step S93 that the number of newly arrived email messages is greater than N, for example, at least 11, CPU 10 sends a control signal to key backlights 14 (Step S96). The content of the control signal is to cause key backlight LEDs 201 other than key backlight LED 201 of email key 61 to light up in a set key backlight color (for example, white) and to cause only key backlight LED 201 of email key 61 to light up in red. CPU 10 further causes key backlights 14 to light up for any set time interval (for example 15 seconds). In each of key backlight LEDs 201 (more specifically, lights 202) in key backlights 14, RGB control units control R, G, and B light-emitting devices in accordance with control signals. Then, after the passage of a fixed time interval (for example, 15 seconds), key backlight LEDs 201 all turn off (Step S97) and the state returns to the standby state.

Key backlight LEDs 201 that are caused to light up in the processing of Steps S94-S96 continue to light for a fixed time interval (for example, 15 seconds), following which key backlight LEDs 201 all turn off and the state returns to the standby state.

Although an example of a notification method relating to newly arrived email by means of key backlight LEDs 201 has been described with reference to FIG. 10 and FIG. 11, when there has been a missed telephone call, the existence of missed calls and the number of missed calls may be reported by causing key backlight LED 201 of received-call history key 62 to light up instead of email key 61.

In the above-described explanation, whether key backlight LEDs 201 are caused to light up or flash on and off, information is reported to the user by causing the produced color of one key backlight LED 201 to differ from the produced color of other key backlight LEDs 201. However, specific information may be reported by causing a plurality of key backlight LEDs 201 to emit light, and further, changing the number of key backlight LEDs 201 that emit light.

Figure 12:
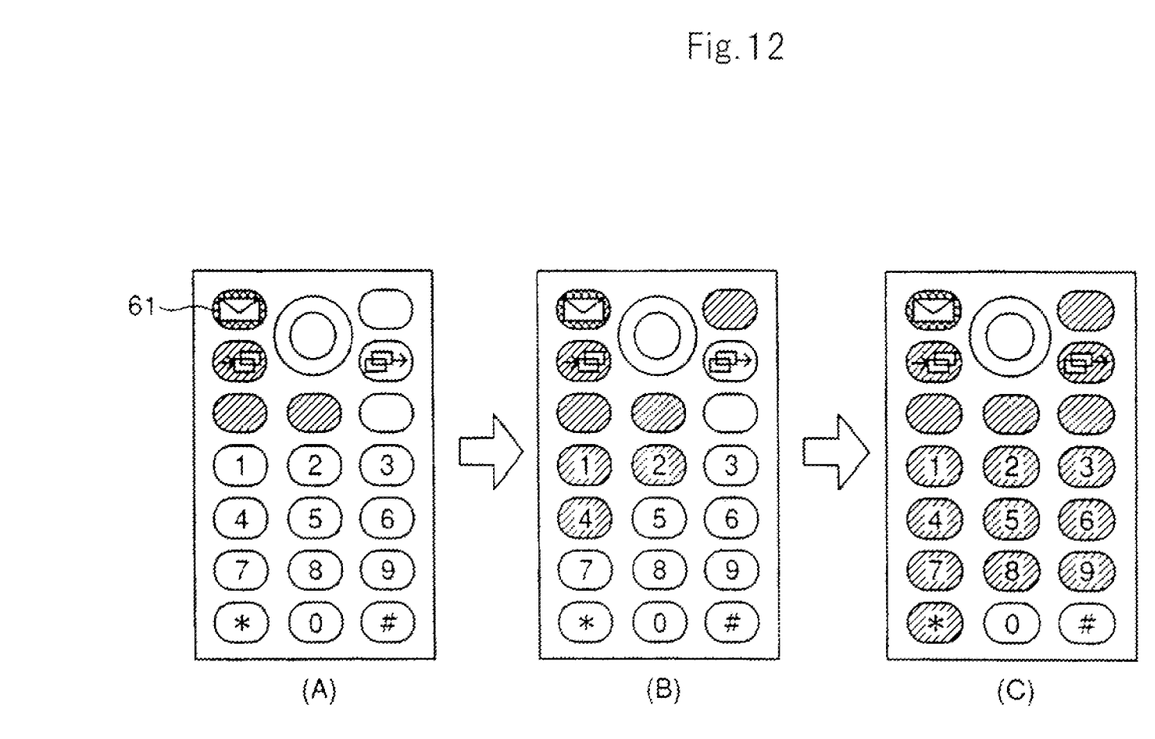
FIG. 12 is an explanatory view showing an example of the lighting pattern when the number of light-emitting key backlight LEDs is changed to report specific information.

FIG. 12 is an explanatory view showing an example of a lighting pattern when the number of key backlight LEDs 201 that emit light is changed to report specific information. FIG. 12 shows that key backlight LEDs 201 indicated by white are lighted up in white, key backlight LEDs 201 indicated by diagonal lines in one direction are lighted up in watery blue, and key backlight LEDs 201 of keys indicated by diagonal lines in two directions (only email key 61 in FIG. 12) are lighted up in blue. In addition, FIGS. 12(A)-(C) show changes in the lighted state that accompany the passage of time.

An example is shown for a case in which the arrival of new email is reported as information. In this example, when there is newly arrived email, only key backlight LED 201 of email key 61 is lighted up in blue, and all other key backlight LEDs 201 are lighted up in white. After the passage of a fixed time interval (for example, 200 ms), the state transitions to the lighted state shown in FIG. 12(A). In the state shown in FIG. 12(A), key backlight LED 201 of email key 61 is blue, key backlight LEDs 201 of the three keys close to email key 61 are lighted up in watery blue, and key backlight LEDs 201 of the remaining keys are lighted up in white.

After the passage of a fixed time interval (for example, 200 ms), the state transitions to the lighted state shown in FIG. 12(B). In the state shown in FIG. 12(B), only email key 61 corresponds to the keys of key backlight LEDs 201 that correspond to a blue light, but compared to the state shown in FIG. 12 (A), the number of key backlight LEDs 201 that are lighted in watery blue has increased to a plurality close to email key 61.

After the passage of a fixed time interval (for example, 200 ms), the state transitions to the lighted state shown in FIG. 12(C). In the state shown in FIG. 12(C), only email key 61 corresponds to the keys of key backlight LED201 that correspond to a blue light, but, compared to the state shown in FIG. 12(B), the number of key backlight LEDs 201 lighted up in watery blue close to email key 61 has further increased.

After the lighted state shown in FIG. 12(C), the number of key backlight LEDs 201 that are lighted in watery blue continues to increase with each passage of a fixed time interval until ultimately key backlight LEDs 201 of all keys other than email key 61 are lighted in watery blue. The gradual increase in the number of adjacent key backlight LEDs 201 that are lighted in the same color causes email key 61 to stand out. The flow from the start of lighting up until the final lighted state is one cycle, and the cycle may be repeated.

As described hereinabove, progressively increasing the number of key backlight LEDs 201 that are lighted close to a key to which the user is to be alerted can give the user an impression of a light-emitting area that steadily changes and can thus more effectively report information to the user.

In the above-described explanation, information is reported to a user by causing a plurality of key backlight LEDs 201 to emit light, and moreover, by causing the number of key backlight LEDs 201 that emit light to increase. However, not only may the number of key backlight LEDs 201 that emit light be changed, but the luminance of each of key backlight LEDs 201 may also be changed to report information to the user.

When the RGB control unit changes the current value that flows in the R, G, and B light-emitting devices in light 202 shown in FIG. 4, the luminance of key backlight LED 201 changes. When a current value higher than the current value during normal use within a specific range of current values is caused to flow in R, G, and B light-emitting devices, key backlight LED 201 emits light brighter (at greater luminance) than the normal luminance. When a current that exhibits a current value lower than the current value during normal use within a specific range of current values is caused to flow to the R, G, and B light-emitting devices, key backlight LED 201 emits light that is darker (at lower luminance) than the normal luminance.

For example, an example of a pattern of change in luminance of key backlight LEDs 201 is next described using the example of the lighting pattern of key backlight LEDs 201 shown in FIG. 12. When the arrival of new email is to be reported as information, only key backlight LED 201 of email key 61 is caused to light up in blue and the key backlight LEDs 201 of all other keys are caused to light up in white of normal luminance or low luminance. After the passage of a fixed time interval (for example, 200 ms), only key backlight LED 201 of the key that is indicated by diagonal lines in two directions in FIG. 12 (only email key in FIG. 12) is caused to light up in white at high luminance and the other key backlight LEDs 201 are caused to light up in white of normal luminance or white of low luminance, whereupon only email key 61 is illuminated more brightly than the other operation keys and the user is able to notice the information. Normal luminance is a prescribed luminance that is determined in advance, luminance that is lower than this luminance being low luminance, and luminance higher than this luminance being high luminance.

In FIG. 12, key backlight LEDs 201 of keys that are indicated by white may be lighted up at low luminance, key backlight LEDs 201 of keys indicated by diagonal lines in one direction may be lighted up at normal luminance, and key backlight LED 201 of the key that is indicated by diagonal lines in two directions (only email key 61 in FIG. 12) may be lighted up at high luminance. CPU 10 implements control such that email key 61 is illuminated at high luminance, and with each passage of a fixed time interval, key backlight LEDs 201 that emit light at low luminance decrease in number and key backlight LEDs 201 that emit light at normal luminance increase in number in the vicinity of email key 61. The luminance of a plurality of key backlight LEDs 201 changes from low luminance to normal luminance in the vicinity of email key 61 that is illuminated at high luminance, whereby the user is able to notice the information.

Alternatively, CPU 10 may implement control such that in the vicinity of email key 61, key backlight LEDs 201 that emit light at normal luminance decrease in number and key backlight LEDs 201 that emit light at low luminance increase in number with each passage of a fixed time interval. In this way, the luminance of a plurality of key backlight LEDs 201 changes from normal luminance to low luminance such that email key 61 that is illuminated at high luminance stands out and the user is able to notice the information.

In addition, controlling the current value that flows to the R, G, and B light-emitting devices allows the luminance of key backlight LEDs 201 to change over a plurality of levels. The luminance may thus be changed in stages from high luminance to low luminance or from low luminance to high luminance to report information to the user.

Although a method in which either numeric keys or symbol keys are used to report information was described in the above-described explanation, both numeric keys and symbol keys may be used to report information to the user. In addition, the produced colors are not limited to the colors in each of the examples described above and may be any colors that can be produced by RGB light-emitting devices.

Still further, the combination of light-emitting devices that is used is not limited to the combination of three RGB light-emitting devices, and may be a combination of light-emitting devices that can produce a plurality of colors that can be perceived as different by the user.

Figure 13:
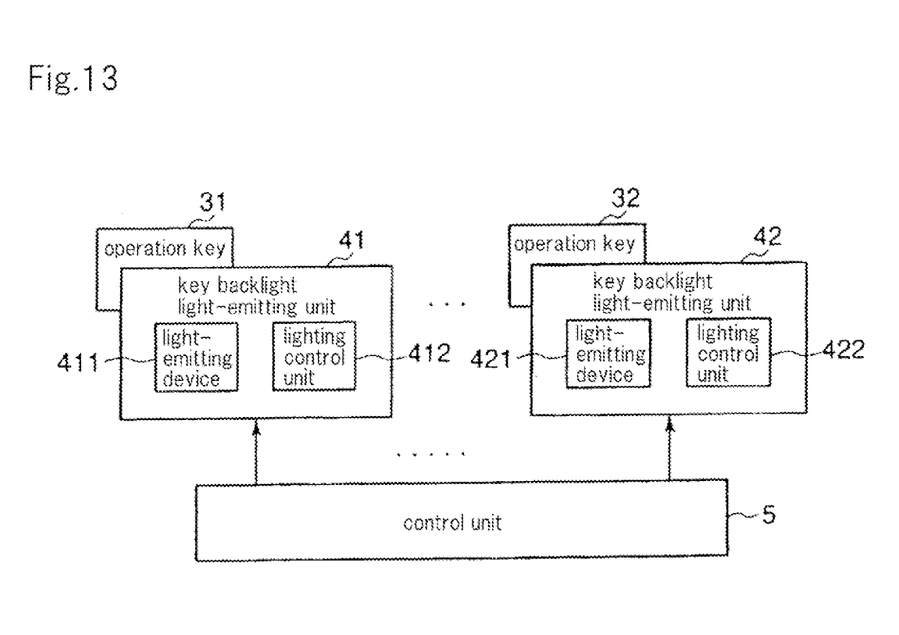
FIG. 13 is a block diagram showing the relations of the principal constituent elements of a portable telephone according to the present invention.

FIG. 13 is a block diagram showing the relation of principal constituent elements of the portable telephone according to the present invention. As shown in FIG. 13, the portable telephone according to the present invention is provided with: key backlight light-emitting units 41 and 42 that are provided corresponding to each of a plurality of operation keys 31 and 32, respectively, and that illuminate operation keys 31 and 32, respectively; and control unit 5 that supplies control signals that provide instructions to key backlight light-emitting units 41 and 42 about the colors of the light that is to be emitted; wherein: key backlight light-emitting units 41 and 42 include a plurality of light-emitting devices 411 and 421, respectively, that produce different colors and lighting control units 412 and 422, respectively, that implement lighting control of the plurality of light-emitting devices 411 and 421, respectively, in accordance with control signals from control unit 5;

and control unit 5 supplies control signals for causing light to be emitted in a specified color to key backlight light-emitting units (for example, (key backlight light-emitting unit 41) that correspond to one or a plurality of operation keys (for example, operation key 31) and supplies control signals for causing light to be emitted in a color different from the specified color to key backlight light-emitting units (for example, key backlight light-emitting unit 42) other than the key backlight light-emitting units that are caused to light up in the specified color.

Possible Application in Industry

The present invention can be applied to portable telephones that are equipped with key backlights that illuminate keys.

The invention claimed is:

1. A portable telephone equipped with key backlights comprising:
    key backlight light-emitting units that are provided corresponding to each of a plurality of operation keys and that illuminate each of the operation keys; and
    a control unit that supplies control signals that provide instructions to said key backlight light-emitting units about colors of light that is to be emitted;
wherein:
    said key backlight light-emitting units each include a plurality of light-emitting devices that produce different colors and a lighting control unit that realizes lighting control of the plurality of light-emitting devices in accordance with control signals from said control unit; and
    said control unit supplies control signals for causing light to be emitted in a specified color in the key backlight light-emitting units that correspond to one or a plurality of operation keys and supplies control signals for causing light to be emitted in colors other than the specified color in said key backlight light-emitting units other than the key backlight light-emitting units that are lighted in the specified color,
wherein:
    upon the occurrence of an event relating to specified information, the control unit supplies control signals that cause light to be emitted in a first specified color to the key backlight light-emitting unit that illuminates a specified operation key that displays the specified information;
    the control unit supplies control signals that cause light to be emitted in a second specified color to the key backlight light-emitting units that illuminate a plurality of operation keys that are installed closed to said specified operation key and that are arranged in different directions with reference to said specified operation key; and
    the control unit, upon the passage of each prescribed time interval, supplies control signals that cause light to be emitted in said second specified color to a greater number of key backlight light-emitting units than the number of key backlight light-emitting units to which control signals that cause light to be emitted in the second specified color were supplied before the passage of the prescribed time interval.

2. The portable telephone equipped with key backlights, according to claim 1, wherein specified information that is displayed by said specified operation key is information indicating electronic mail.

3. An information notification method that uses key backlights that is executed in a portable telephone that is equipped with key backlight light-emitting units that are provided corresponding to a plurality of operation keys and that illuminate each of the operation keys, the key backlight light-emitting units each including a plurality of light-emitting devices that produce different colors and a lighting control unit that controls lighting of the plurality of light-emitting devices; the information notification method comprising steps of:
    causing light to be emitted in a specified color by key backlight light-emitting units that correspond to one or a plurality of operation keys; and causing light to be emitted in colors other than the specified color by said key backlight light-emitting units other than the key backlight light-emitting unit that is lighted in the specified color,
wherein:
    upon the occurrence of an event relating to specified information, causing light to be emitted in a first specified color to the key backlight light-emitting unit that illuminates a specified operation key that displays the specified information; causing light to be emitted in a second specified color to the key backlight light-emitting units that illuminate a plurality of operation keys that are installed closed to said specified operation key and that are arranged in different directions with reference to said specified operation key; and increasing the number of said key backlight light-emitting units that emit said second specified color with each passage of a prescribed time interval.

4. The information notification method according to claim 3, wherein specified information that is displayed by said specified operation key is information indicating electronic mail.

* * * * *